(12) United States Patent
Higuchi

(10) Patent No.: US 6,314,004 B1
(45) Date of Patent: Nov. 6, 2001

(54) SWITCHING POWER SOURCE

(75) Inventor: Yoshio Higuchi, Osaka (JP)

(73) Assignee: Funai Electric Co. Ltd., Daito (JP)

( * ) Notice: Subject to any disclaimer, the term of this patent is extended or adjusted under 35 U.S.C. 154(b) by 0 days.

(21) Appl. No.: 09/310,057

(22) Filed: May 11, 1999

(51) Int. Cl.$^7$ .............................. H02M 3/335; H02M 3/24
(52) U.S. Cl. ................................. 363/21.07; 363/21.09; 363/97; 363/19
(58) Field of Search .................. 363/21, 21.07, 363/95, 97, 98, 131; 323/284, 285, 288

(56) References Cited

U.S. PATENT DOCUMENTS

| | | | | |
|---|---|---|---|---|
| 4,330,816 | * | 5/1982 | Imazeki et al. | 363/56 |
| 4,862,339 | * | 8/1989 | Inou et al. | 363/21 |
| 5,034,871 | * | 7/1991 | Okamoto et al. | 363/21 |
| 5,297,014 | * | 3/1994 | Saito et al. | 363/21 |
| 5,774,347 | * | 6/1998 | Nakanishi | 363/21 |
| 5,903,452 | * | 5/1999 | Yang | 363/97 |

FOREIGN PATENT DOCUMENTS

| | | |
|---|---|---|
| Publ. 3323371 A1 | 1/1985 | (DE) . |
| Publ. 4244530 A1 | 7/1994 | (DE) . |
| Publ. 0386 989 A2 | 9/1990 | (EP) . |
| 4-29482 | 1/1992 | (JP) . |
| Appln. 06002417 | 1/1994 | (JP) . |
| 7-213054 | 8/1995 | (JP) . |
| 30-40910 | 6/1997 | (JP) . |

* cited by examiner

*Primary Examiner*—Rajnikant B. Patel

(57) ABSTRACT

A switching power source in which the voltage error of a secondary side DC output is fed back to a switching circuit through an insulating element, thereby to stabilize the output voltage. In the switching power source, irrespective of the voltage of the secondary side DC output, a pulse of the level with which an error detecting circuit determines that the voltage of the secondary side DC output has been increased is applied to the error detecting circuit, whereby the switching operation of the switching circuit is changed into an intermittent operation corresponding to the pulse.

3 Claims, 3 Drawing Sheets

SWITCHING POWER SOURCE

BACKGROUND OF THE INVENTION

1. Field of the Invention

This invention relates to a switching power source in which the voltage error of a secondary side DC output is fed back to a switching circuit through an insulating element, thereby to stabilize the output voltage, and more particularly to a switching power source in which a switching circuit is caused to perform an intermittent switching operation with pulses applied to an error detecting circuit.

2. Description of the Related Art

The efficiency of a switching power source is lowered when its load is extremely low. Therefore, a variety of techniques have been proposed in the art to prevent the lowering of the efficiency when the load is low. An example of the techniques has been disclosed in Japanese Patent Unexamined Publication No. Hei. 4-29482. In the technique, a standby control section is provided which connects the base of a switching transistor to the ground (level) and disconnects it from the ground (level). Further, the standby control section is so designed that the connection is made for a half of one cycle of the commercial power source, or for a predetermined period of the same. Hence, every one cycle of the commercial power source, the switching stop occurs for a half cycle, or for a predetermined period. Therefore, the average value of the switching loss is decreased, so that the conversion efficiency is improved.

However, the above-described conventional technique suffers from the following problems: That is, only in the case where the load becomes low, it is necessary to perform the switching operation intermittently. In the case where the load is ordinary, it is necessary to perform the switching operation continuously. Hence, in the case of the ordinary load, it is necessary to generate a stop signal to stop the operation of the standby control section, and to apply the stop signal thus generated to the standby control section. On the other hand, the standby control section is the primary side block, and the stop signal is generated by the secondary side block. Therefore, it is necessary to provide a photocoupler in the path of transmission of the stop signal. However, the photocoupler is expensive, which means that the resultant switching power source is high in manufacturing cost.

SUMMARY OF THE INVENTION

The invention was made to solve the above-described problems, and it is an object of the invention to provide a switching power source in which without addition of an insulating element for switching control, two kinds of operations, that is, a continuous switching operation and an intermittent switching operation, are switched from the secondary side.

In order to achieve the above object, according to the invention, there is provided a switching power source comprising: an error detecting circuit for detecting a voltage error of a secondary side DC output; a switching circuit for switching a current flowing in a primary coil, to which the voltage error detected by the error detecting circuit is fed back through an insulating element, thereby to stabilize the voltage of the secondary side DC output; and a pulse generating section for applying, irrespective of the voltage of the secondary side DC output, a pulse to the error detecting circuit with the level of which the error detecting circuit determines that the voltage of the secondary side DC output has been increased, whereby a switching operation of the switching circuit is changed into an intermittent operation corresponding to the pulse.

That is, when the pulse generating section provides a predetermined level (for instance "H" level) indicating a pulse, the error detecting circuit determines that the voltage of the DC output has been increased, and the drive current of the insulating element is increased. As a result, the output current of the insulating element is greatly increased, and therefore the switching operation of the switching circuit is stopped. On the other hand, when the pulse generating section provides a level (for instance "L" level) which does not correspond to a pulse, the error detecting circuit drives the insulating element with a current corresponding to the voltage error of the DC output. Hence, the switching circuit performs the switching operation with a cycle corresponding to the output of the insulating element. That is, in the case where the pulses are provided, the level corresponding to the pulses and the level which does not correspond to the pulses are alternately applied to the error detecting circuit, so that the switching circuit performs an intermittent switching operation. On the other hand, in the case where the level which does not correspond to the pulses is continuously applied to the error detecting circuit, the switching circuit performs a continuous switching operation.

DETAILED DESCRIPTION OF THE PREFERRED EMBODIMENT

A preferred embodiment of the invention will be described with reference to the accompanying drawings.

Figure 1:
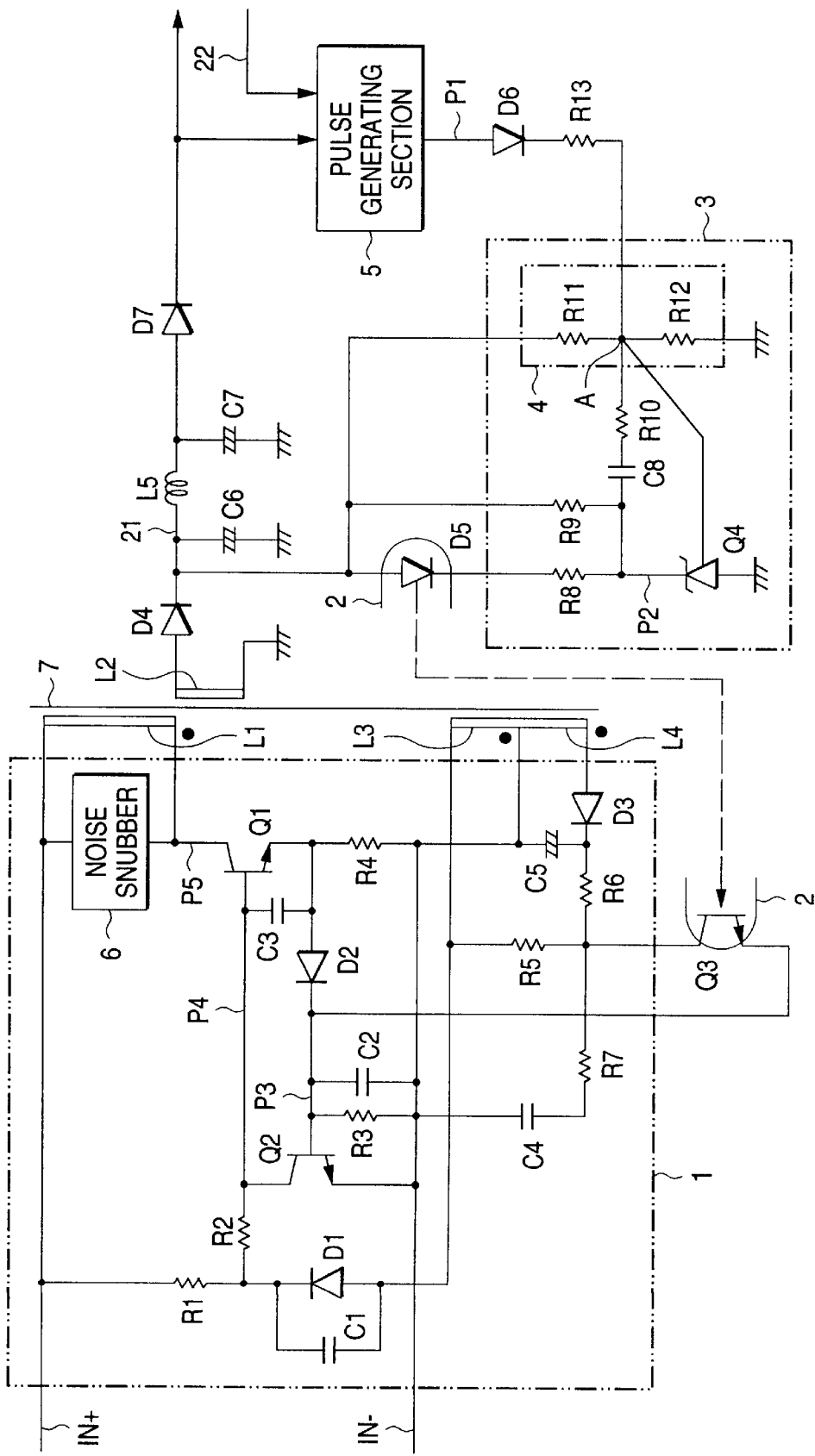
FIG. 1 is a circuit diagram showing the electrical connection of a switching power source, which constitutes an embodiment of the invention.

FIG. 1 is a circuit diagram showing the electrical connection of a switching power source according to the embodiment of the invention.

As shown in FIG. 1, a block 1, which comprises two transistors Q1 and Q2, three diodes D1 through D3, seven resistors R1 through R7, and five capacitors C1 through C5, is a switching circuit adapted to switch a current flowing in a primary coil L1 of a high-frequency transformer 7. A block 3, which comprises a shunt regulator Q4, five resistors R8 through R12, and one capacitor C8, is an error detecting circuit adapted to detect the voltage error of a secondary side DC output (hereinafter referred to merely as "a DC output", when applicable) 21. The voltage error thus detected is fed back through a photocoupler 2 which is an insulating element to the switching circuit 1 to stabilize the voltage of the DC output 21. A pulse generating section 5 is a block which, irrespective of the voltage of the DC output 21, applies a pulse to the error detecting circuit 3 the level of which is such that the error detecting circuit 3 determines that the voltage of the DC output 21 has been increased.

Specifically, a plus IN+ and a minus IN− which are connected to the switching circuit 1 form a DC power source which is obtained by rectifying and smoothing the commercial power source. The switching transistor Q1 is an element to switch the current flowing in the primary coil L1. Therefore, one terminal of the primary coil L1 is connected to the plus IN+, and the other terminal thereof is connected to the collector of the switching transistor Q1. The emitter of the switching transistor Q1 is connected to the minus IN– through the resistor R4 adapted to detect an emitter current as a voltage.

The resistor R1, one terminal of which is connected to the plus IN+, is an element adapted to supply a start current to the switching transistor Q1. The other terminal of the resistor R1 is connected to the base of the switching transistor Q1 through the base resistor R2 adapted to limit the base current. In order to prevent a parastic oscillation, the capacitor C3 small in capacitance is connected between the base and the emitter of the switching transistor Q1. A noise snubber 6, which comprises a capacitor, a resistor, and a diode, is connected in parallel to the primary coil L1.

The control transistor Q2 is an element which controls the base current of the switching transistor Q1 thereby to stabilize the voltage of the DC output 21. For this purpose, the collector of the control transistor Q2 is connected to the base of the switching transistor Q1. In addition, the base of the control transistor Q2 is connected to the emitter of the phototransistor Q3 adapted to transmit a voltage error of the DC output 21. The base of the control transistor Q2 is connected through the noise absorbing capacitor C2 to the minus IN–. The discharging resistor R3 is connected in parallel to the capacitor C2. In order to limit the current which flows in the switching transistor Q1 when the power switch is turned on, the voltage detected by the resistor R4 is applied through the diode D2 to the base of the control transistor Q2. The emitter of the control transistor Q2 is connected to the minus IN–.

A first auxiliary coil L3, one terminal of which is connected to the minus IN–, is an element which allows the switching transistor Q1 to self-oscillate. For this purpose, the other terminal of the first auxiliary coil L3 is connected through the diode D1 to the connecting point of the resistor R1 and the resistor R2. In order to increase the turn-off speed of the switching transistor Q1, the capacitor C1 is connected in parallel to the diode D1. The other terminal of the first auxiliary coil L3 is connected through the resistor R5 to the collector of the phototransistor Q3. A series circuit comprising the resistor R7 and the capacitor C4 is connected between the collector of the phototransistor Q3 and the minus IN–.

One terminal of the second auxiliary coil L4 is the one terminal of the first auxiliary coil L3. When the switching transistor Q1 is turned off, a positive (plus) voltage is provided on the other terminal of the second auxiliary coil L4. For this purpose, the other terminal of the second auxiliary coil L4 is connected to the anode of the diode D3. The cathode of the diode D3 is connected through the smoothing capacitor C5 to the minus IN–. Further, the cathode of the diode D3 is connected through the resistor R6 to the collector of the phototransistor Q3. That is, the second auxiliary coil L4, the diode D3, and the capacitor C5 form an auxiliary power source adapted to supply a DC voltage to the collector of the phototransistor Q3.

One terminal of the secondary coil L2 of the high-frequency transformer 7 is connected to the anode of the rectifying diode D4. The cathode of the rectifying diode D4 is connected to a π type smoothing circuit which comprises two capacitors C6 and C7, and a choke coil L5. The other terminal of the secondary coil L2 is grounded. The diode D7 connected to the output of the smoothing circuit is a shifter adapted to decrease the voltage of the DC output 21. The voltage of the DC output 21 which is provided by the π type smoothing circuit is about 6 V. The voltage of the DC output which is provided by the cathode of the diode D7 is +5 V, and is applied to a microcomputer or the like as an operating power source.

The shunt regulator Q4 is an element which detects the voltage error of the DC output 21, and drives the light emitting diode D5 with a current corresponding to the voltage error thus detected. More specifically, the drive current of the light emitting diode D5 is changed so that the output voltage of a voltage division circuit 4 consisting of resistors R11 and R12 is 2.5 V. For this purpose, the anode of the light emitting diode D5 is connected to the DC output 21. Further, the cathode of the light emitting diode D5 is connected through the current-limiting resistor R8 to the cathode of the shunt regulator Q4. In addition, the cathode of the shunt regulator Q4 is connected through the resistor R9 to the DC output 21. The detecting terminal of the shunt regulator Q4 is connected to the output point A (connecting point of the resistors R11 and R12) of the voltage division circuit 4. A series circuit consisting of the capacitor C8 and the resistor R10 is a phase correcting circuit adapted to prevent the oscillation which a feedback circuit forms with the aid of the photocoupler 2.

The embodiment is so designed as to provide DC outputs of a plurality of kinds of voltages. For this purpose, secondary coils for other DC outputs are wound on the high-frequency transformer 7, and the secondary coils are connected to rectifying and smoothing circuits, respectively. Those secondary coils, and the rectifying and smoothing circuits are not shown.

The pulse generating section 5 is a block which is made up of part of the function of a microcomputer which controls a device (such as a television set, a video cassette deck, and a CD player) which employs the embodiment as its DC source. When the aforementioned device is placed in a power source off mode (or a standby mode) in the state of supply of the commercial power source, in order to change the switching operation of the switching circuit 1 into an intermittent operation, the "H" level pulse is generated, and is applied to the output point A of the voltage division circuit 4.

The pulse generated by the pulse generating circuit 5 is applied through a diode D6 and a resistor R13 to the output point A of the voltage division circuit 4. On the other hand, the impedance of the output point A is substantially equal to the impedance of the resistors 11 and 12 which are connected in parallel to each other. The resistors 11 and 12 are each several kilo-ohms (KΩ). Therefore, the impedance of the output point A is high. Hence, the resistor R13 is of 2 to 3 KΩ. As a result, the current drive capacity of the output terminal (output terminal of the microcomputer chip) to which the anode of the diode D6 is connected satisfies the current drive capacity which is required for the output terminal of the pulse. This feature eliminates the provision of an additional circuit which is adapted to increase the current drive capacity of the terminal through which the pulse is provided.

Figure 2:
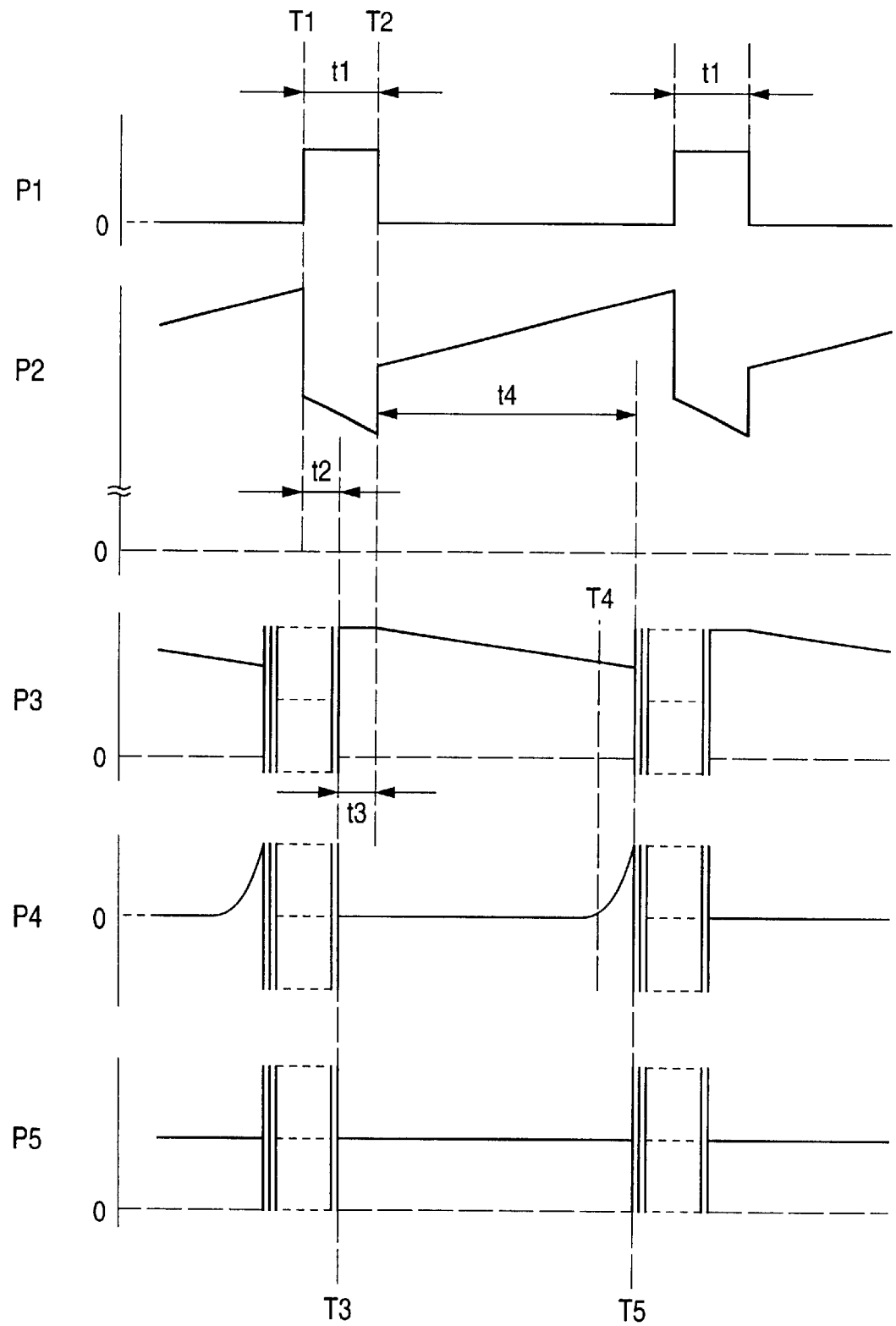
FIG. 2 is a timing chart indicating the waveforms of main signals in the embodiment.

FIG. 2 is a timing chart indicating the waveforms of main signals in the embodiment. In FIG. 2, P1 indicates the output waveform of the pulse generating section 5; P2, the signal waveform of the cathode of the shunt regulator Q4: P3, the signal waveform of the base of the control transistor Q2; P4, the signal wave of the base of the switching transistor Q1; and P5, the signal waveform of the collector of the switching transistor Q1. The operation of the embodiment will be described with reference to FIG. 2.

In the case where the mode indicated by the signal line 22 is the operating mode that the device performs the ordinary operation, the pulse generating section 5 provides no pulse (the output terming being at "L" level). In this case, owing to the action of the diode D6, the path from the resistor R13 to the pulse generating section 5 can be disregarded. Accordingly, the light emitting diode D5 is driven by the current which corresponds to the voltage error of the DC output 21. As a result, the voltage of the DC output 21 is maintained at 6 V which is a set voltage. On the other hand, in the case where the mode indicated by the signal line 22 becomes the standby mode, the pulse generating section 5 applies the "H" level pulse to the error detecting circuit 3.

In the case where the pulse generating section 5 provides a pulse, the operation of the embodiment is in brief as follows. That is, when the pulse generating section 5 provides an "H" level indicating a pulse, irrespective of the voltage of the DC output 21, the voltage of the output point A is increased. The increase of the voltage of the output point A means that, for the shunt regulator Q4, the voltage of the DC output 21 is increased. Therefore, in order to decrease the voltage of the DC output 21, the shunt regulator Q4 greatly increases the drive current of the light emitting diode D5. As a result, the emitter current of the phototransistor Q3 is greatly increased, and the base current of the control transistor Q2 is increased. Hence, the control transistor Q2 is turned on, to set the base current of the switching circuit 1 to a value close to zero (0), so that the switching operation of the switching transistor Q1 is stopped.

On the other hand, when the pulse generating section 5 provides a level (L level) which does not corresponds to a pulse, the path from the resistor R13 to the pulse generating section 5 can be disregarded. Therefore, the shunt regulator Q4 drives the light emitting diode D5 with a current corresponding to the voltage error of the DC output 21. As a result, the switching circuit 1 performs a switching operation so that the DC output 21 is a predetermined voltage (6 V).

The relation between the "H" level pulse provided by the pulse generating section 5 and the switching operation of the switching circuit 1 is fundamental as described above. However, in the embodiment, because of the effect of a phase correcting circuit consisting of the capacitor C8 and the resistor R10, and that of the capacitor C2 connected to the base of the control transistor Q2, the timing of the intermittent operation is delayed. This will be described below in detail.

When the switching transistor Q1 performs the switching operation, the capacitor C5 is charged by the positive (plus) voltage provided by the second auxiliary coil L4. The terminal voltage of the capacitor C5 thus charged is maintained at a substantially constant value for one cycle of the pulse provided by the pulse generating section 5. That is, also in the case where the switching operation is carried out intermittently, the capacitor C5 becomes a voltage source which provides a predetermined voltage.

On the other hand, when the "H" level pulse is applied to the output point A, the shunt regulator Q4 determines that the voltage of the DC output 21 has been greatly increased. As a result, the shunt regulator Q4, increasing the drive current of the light emitting diode D5, abruptly decreases the voltage of the cathode (P2) (time instant T1). On the other hand, when the provision of the "H" level pulse is stopped, the shunt regulator Q4 determines that the voltage of the DC output 21 has become close to the set voltage. As a result, the shunt regulator Q4, decreasing the drive current of the light emitting diode D5, abruptly increases the voltage of the cathode (P2) (time instant T2). The decrease of the voltage of the cathode (P2) for the period t1 is due to the charge current of the capacitor C8.

The current flowing in the phototransistor Q3 is proportional to the drive current of the light emitting diode D5. Hence, in the period t1 in which the drive current of the light emitting diode D5 is considerably large, the phototransistor Q3 is saturated. When the phototransistor Q3 is saturated, the element interposed between the capacitor C5 and the control transistor Q2 is equivalently only the resistor R6. Therefore, when, with the time instant T1 as the start point, the delay time t2 elapses which is determined by the values of the resistor R6 and the capacitor C2 (time instant T3), the control transistor Q2 is saturated. Hence, the switching operation of the switching transistor Q1 is stopped at the time instant T3.

For the period t3 from the time instant T3 (when the switching operation stops) till the time instant T2 (when the "H" level pulse is ended), the base voltage (P3) of the control transistor Q2 is maintained substantially constant. After the time instant T3, the emitter current of the phototransistor Q3 decreases, so that the base voltage (P3) of the control transistor Q2 is also decreased. When the base voltage of the control transistor Q2 is decreased to about 0.5 V, the base current does not flow, and therefore the control transistor Q2 is turned off (time instant T4). Therefore, at the time instant T4, all the current which flows in the resistor R1 flows to the switching transistor Q1, so that the base voltage (P4) of the switching transistor Q1 is increased. At the time instant T5, the current which is supplied through the resistor R1 flows to the base of the switching transistor Q1, and the switching operation is started.

Thereafter, the switching operation is stopped with the above-described timing. That is, the intermittent switching operation is carried out in which, with respect to the pulse provided by the pulse generating section 5, the switching is stopped with a delay of period t2, and is started with a delay of period t4 (see P5).

Figure 3:
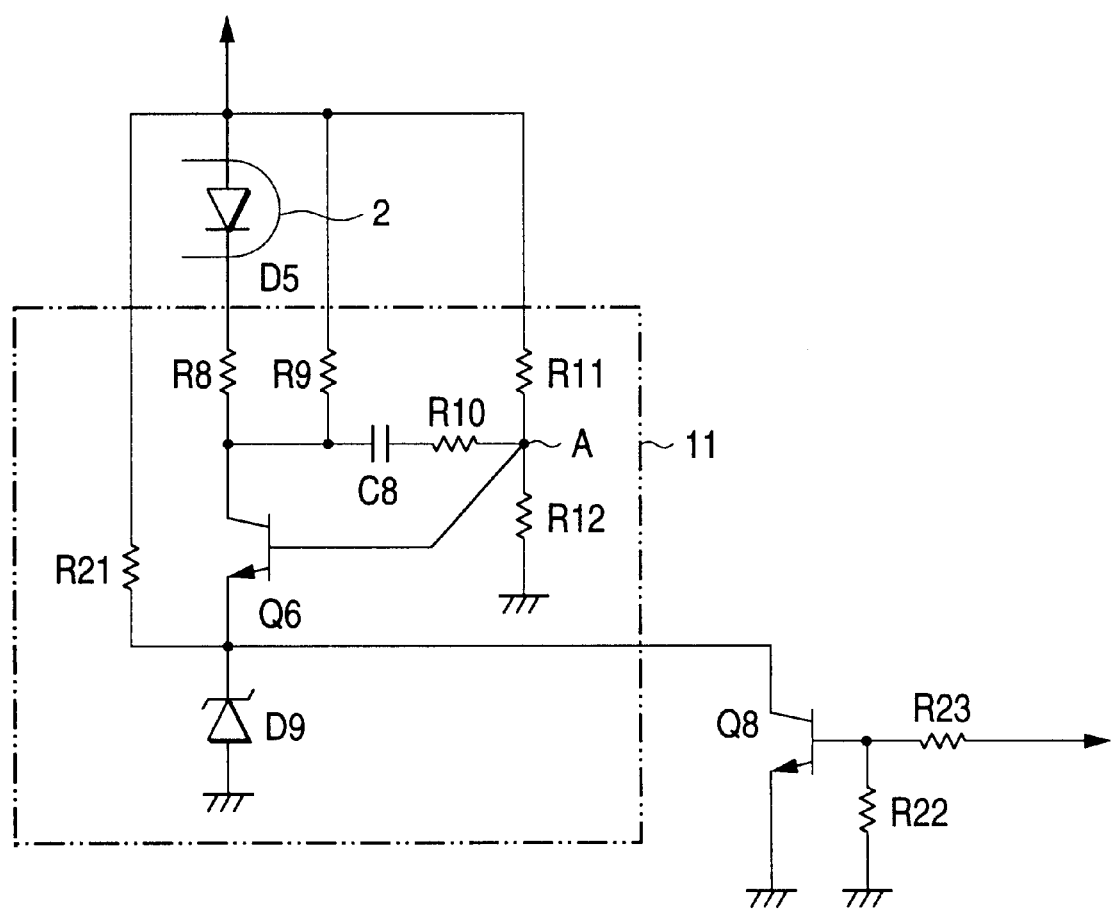
FIG. 3 is a circuit diagram showing an example of an error detecting circuit which uses a transistor for error detection.

FIG. 3 is a circuit diagram showing an electrical connection in an embodiment in which the pulse generated by the pulse generating section 5 is applied to a point which is different from the output point A of the voltage division circuit. In FIG. 3, parts corresponding functionally to those already described with reference to FIG. 1 are therefore designated by the same reference numerals or characters.

In order to allow the circuit (FIG. 3) to perform the same function as the shunt regulator Q4, the circuit includes three elements: a Zener diode D9 which generates a reference voltage; a resistor R21 which supplies a current to the Zener diode D9; and a transistor Q6 which compares a divided voltage with the reference voltage, and drives the light emitting diode D5 with a current corresponding to the result of the voltage comparison. In addition, the pulse supplying point is the emitter of the transistor Q6. On the other hand, the emitter of the transistor Q6 being low in impedance, in order to increase the driving capacity of the pulse output, the output of the pulse generating section 5 is applied through a resistor R23 to the base of the transistor Q8. The collector of the transistor Q8 is connected to the emitter of the transistor Q6 (a resistor R22 preventing the base of the transistor Q8 from becoming open).

The circuit is designed as described above. Therefore, when the pulse generating section 5 provides the "H" level corresponding to a pulse, the emitter of the transistor Q6 is set to a level close to the ground level. Hence, although the voltage of the output point A is not changed, it is determined that the voltage of the DC output 21 has been increased, and the current for driving the light emitting diode D5 is increased. When the pulse forming section 5 provides the "L" level which does not correspond to a pulse, the transistor Q6 drives the light emitting diode D5 with the current corresponding to the voltage of the output point A. Hence, when the pulse generating section 5 continuously provides pulses, the operation of the error detecting circuit 11 is equal to the operation of the error detecting circuit 3 of FIG. 1, and the switching circuit 1 performs the intermittent switching operation.

The pulse generating section 5 has been described with the case where it is made up of part of the function of the microcomputer; however, in the case where it is so designed that it has a control input to stop the outputting of the pulse, it may be of hardware.

CONCRETE EXAMPLE

The circuit shown in FIG. 1 has been tested. In this test, the values of the elements, the pulse conditions, and the results of test are as follows:

The values of the elements:

| | |
|---|---|
| R1 | 300 KΩ |
| R2 | 100 KΩ |
| R3 | 22 KΩ |
| R4 | 0.91 Ω |
| R5 | 3.3 KΩ |
| R6 | 3.3 KΩ |
| R7 | 3.3 KΩ |
| R8 | 820 Ω |
| R9 | 1 KΩ |
| R10 | 820 Ω |
| R11 | 2.2 KΩ |
| R12 | 1.5 KΩ |
| R13 | 2.2 KΩ |
| C1 | 12 nF |
| C2 | 3.3 nF |
| C3 | 10 nF |
| C4 | 4.7 nF |
| C5 | 10 μF |
| C8 | 22 nF |

The pulse conditions are as follows:

| | |
|---|---|
| Pulse frequency | 4–5 KHz |
| Pulse width | 25–35 μs |
| Pulse level | 5 V |

The results of the test are as follows: It is assumed that, with the above-described conditions, the primary side power consumption is 1.5 W when the pulse generating section 5 provides no pulse. In this case, the primary side power consumption is decreased to 0.9 W when the pulse generating section 5 provides a pulse.

Also in the case where the pulse frequency is made higher than 5 KHz, the intermittent switching operation is carried out in correspondence to the pulse. However, in the case where the load is made extremely low, and the voltage of the DC output 21 is increased, the switching operation does not occur per pulse (not proportional to the pulse); that is, the intermittent switching operation is irregular in which no switching occurs with some of the pulses. In the case where the pulse frequency is made lower than 4 KHz, the voltage of the DC output 21 is decreased.

The switching power source of the invention is applied to the switching power source in which the voltage error detected by the error detecting circuit is fed back through the insulating element to the switching circuit, thereby to stabilize the voltage of the secondary side DC output. Irrespective of the voltage of the secondary side DC output, the pulse of the level with which the error detecting circuit determines that the voltage of the secondary side DC output has been increased is applied to the error detecting circuit, so that the switching operation of the switching circuit is changed into the intermittent operation which corresponds to the pulse. That is, when the pulse generating section provides the level which corresponds to the pulse, the switching operation of the switching circuit is stopped, and when the level which does not correspond to the pulse is provided, the switching circuit performs the switching operation. In other words, the intermittent switching operation corresponding to the pulses is carried out. On the other hand, in the case where the level which does not correspond to the pulse is continuously provided, the continuous switching operation is carried out. Accordingly, the intermittent switching operation and the continuous switching operation are switched over to each other depending on whether or not the pulse is supplied to the error detecting circuit. Hence, without addition of the insulating element for switching control, the switching of two operations, that is, the continuous switching operation and the intermittent switching operation, can be achieved from the secondary side.

What is claimed is:

1. A switching power source comprising:

a single error detecting circuit for detecting a voltage error of a secondary side DC output;

a switching circuit for switching a current flowing in a primary coil, to which the voltage error detected by said error detecting circuit is fed back through a single isolating element, thereby to stabilize the voltage of the secondary side DC output; and a pulse generating section for applying, irrespective of the voltage of the secondary side DC output, a pulse to said error detecting circuit with the level of which said error detecting circuit determines that the voltage of said secondary side DC output has been increased, a switching operation of said switching circuit changing into an intermittent operation corresponding to the pulse.

2. The switching power source as claimed in claim 1, wherein said error detecting circuit compares the output of a voltage division circuit for dividing the voltage of the secondary side DC output with a reference voltage, thereby to detect the voltage error of the secondary side DC output, and the pulse which is applied by said pulse generating section is an "H" level pulse which is applied to a divided-voltage output point of the voltage division circuit.

3. A switching power source comprising:

a single error detecting circuit for detecting a voltage error of a secondary side DC output;

a switching circuit for receiving a DC power input and for switching a current flowing in a primary coil, to which the voltage error detected by said error detecting circuit is fed back through a single isolating element, thereby to stabilize the voltage of the secondary side DC output; and a pulse generating section for applying, irrespective of the voltage of the secondary side DC output, a pulse to said error detecting circuit with the level of which said error detecting circuit determines that the voltage of said secondary side DC output has been increased, a switching operation of said switching circuit changing into an intermittent operation corresponding to the pulse.

* * * * *